(12) United States Patent
Konetski et al.

(10) Patent No.: US 8,468,362 B2
(45) Date of Patent: Jun. 18, 2013

(54) SYSTEM AND METHOD FOR PROVIDING ACCESS TO AN INFORMATION HANDLING SYSTEM

(75) Inventors: David Konetski, Austin, TX (US); Frank H. Molsberry, Georgetown, TX (US)

(73) Assignee: Dell Products, LP, Round Rock, TX (US)

( * ) Notice: Subject to any disclaimer, the term of this patent is extended or adjusted under 35 U.S.C. 154(b) by 118 days.

(21) Appl. No.: 13/152,470

(22) Filed: Jun. 3, 2011

(65) Prior Publication Data

US 2012/0311699 A1 Dec. 6, 2012

(51) Int. Cl.
*G06F 21/00* (2006.01)
*G06F 7/04* (2006.01)

(52) U.S. Cl.
USPC .............. 713/186; 713/161; 713/168; 726/5; 726/17; 726/18; 726/28; 726/29

(58) Field of Classification Search
None
See application file for complete search history.

(56) References Cited

U.S. PATENT DOCUMENTS

| 7,171,680 | B2 | 1/2007 | Lange |
| 7,234,064 | B2* | 6/2007 | Menschik et al. ............ 713/193 |
| 7,689,833 | B2 | 3/2010 | Lange |
| 2004/0034550 | A1* | 2/2004 | Menschik et al. ............... 705/3 |
| 2008/0027338 | A1* | 1/2008 | Lu et al. ....................... 600/509 |
| 2009/0150320 | A1* | 6/2009 | Geppert ......................... 706/47 |

* cited by examiner

*Primary Examiner* — Kaveh Abrishamkar
(74) *Attorney, Agent, or Firm* — Larson Newman, LLP

(57) ABSTRACT

An information handling system includes a memory and a detector circuit. The memory is configured to store a first electrocardiogram measurement. The detector circuit is configured to receive a second electrocardiogram measurement in response to a specific combination of keys of a keyboard being pressed for a specific period of time, wherein each key in the specific key combination includes an electrocardiogram sensor on a top surface of the key, to authorize a user and log the user onto the information handling system when the second electrocardiogram measurement matches the first electrocardiogram measurement, and otherwise: to deny access to the information handling system; to increase a counter; to determine whether the counter has exceeded a threshold; and to request that an input window is displayed when the counter has exceeded the threshold.

18 Claims, 6 Drawing Sheets

SYSTEM AND METHOD FOR PROVIDING ACCESS TO AN INFORMATION HANDLING SYSTEM

FIELD OF THE DISCLOSURE

This disclosure generally relates to information handling systems, and more particularly relates to a system and method for providing access to an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Access to an information handling system can be protected, such that only authorized users can access the information handling system. Thus, the information handling system can require a user to provide access information before granting the user access to the information handling system. The access information can include a username and password, biometric information, an authentication key, or the like.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
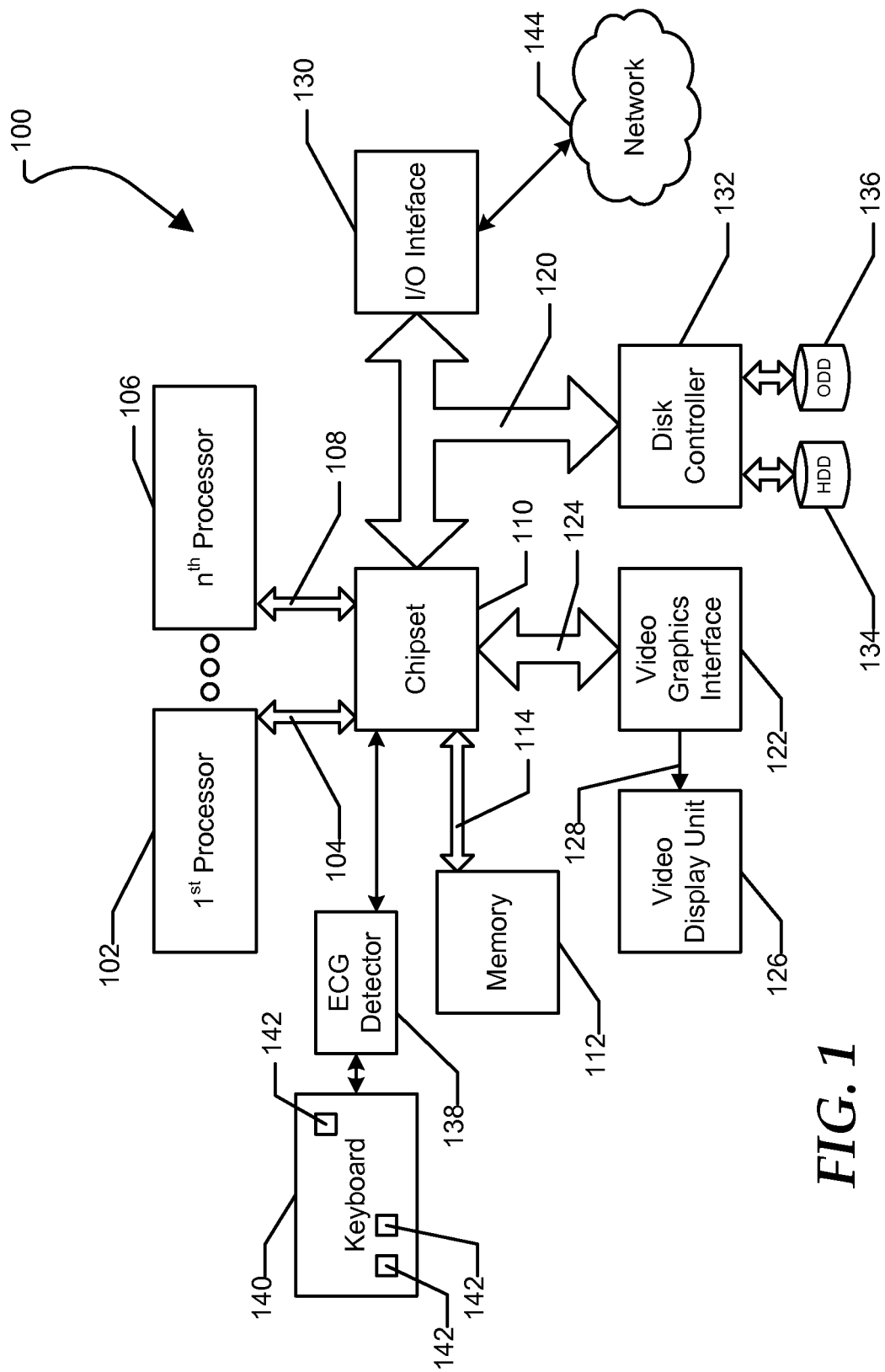
FIG. 1 is a block diagram of an information handling system.

FIG. 1 illustrates a block diagram of an information handling system, generally designated at 100. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a tablet, a mobile computing device, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

As shown in FIG. 1, the information handling system 100 can include a first physical processor 102 coupled to a first host bus 104 and can further include additional processors generally designated as $n^{th}$ physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include an Accelerated Hub Architecture (AHA) that uses a dedicated bus to transfer data between first physical processor 102 and the $n^{th}$ physical processor 106. For example, the chipset 110, including an AHA enabled-chipset, can include a memory controller hub and an input/output (I/O) controller hub. As a memory controller hub, the chipset 110 can function to provide access to first physical processor 102 using first bus 104 and $n^{th}$ physical processor 106 using the second host bus 108. The chipset 110 can also provide a memory interface for accessing memory 112 using a memory bus 114. In a particular embodiment, the buses 104, 108, and 114 can be individual buses or part of the same bus.

The chipset 110 can also provide bus control and can handle transfers between the buses 104, 108, and 114.

According to another aspect, the chipset 110 can be generally considered an application specific chipset that provides connectivity to various buses, and integrates other system functions. For example, the chipset 110 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 110. The chipset 110 can also be packaged as an application specific integrated circuit (ASIC).

The information handling system 100 can also include a video graphics interface 122 that can be coupled to the chipset 110 using a third host bus 124. In one form, the video graphics interface 122 can be an Accelerated Graphics Port (AGP) interface to display content within a video display unit 126. Other graphics interfaces may also be used. The video graphics interface 122 can provide a video display output 128 to the video display unit 126. The video display unit 126 can include one or more types of video displays such as a flat panel display (FPD) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a Peripheral Component Interconnect (PCI) bus or a high speed PCI-Express bus. In one embodiment, a PCI bus can be operated at approximately 16 MHz and a PCI-Express bus can be operated at approximately 128 MHz. PCI buses and PCI-Express buses can be provided to comply with industry standards for connecting and communicating between various PCI-enabled hardware devices. Other buses can also be provided in association with, or independent of, the I/O bus 120 including, but not limited to, industry standard buses or proprietary buses, such as Industry Standard Architecture (ISA), Small Computer Serial Interface (SCSI), Inter-Integrated Circuit (I²C), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first bus 104 and the second bus 108 coupled to the n$^{th}$ physical processor 106. The chipset 110 can also include a Southbridge portion (not illustrated) of the chipset 110 and can handle I/O functions of the chipset 110. The Southbridge portion can manage the basic forms of I/O such as Universal Serial Bus (USB), serial I/O, audio outputs, Integrated Drive Electronics (IDE), and ISA I/O for the information handling system 100.

The information handling system 100 can further include a disk controller 132 coupled to the I/O bus 120, and connecting one or more internal disk drives such as a hard disk drive (HDD) 134 and an optical disk drive (ODD) 136 such as a Read/Write Compact Disk (R/W CD), a Read/Write Digital Video Disk (R/W DVD), a Read/Write mini-Digital Video Disk (R/W mini-DVD), or other type of optical disk drive.

The information handling system 100 can also include an electrocardiogram (ECG) detector circuit 138, which can be in communication with a keyboard 140 and with the chipset 110. In another embodiment, the ECG detector circuit 138 may be integrated within the keyboard 140. The ECG detector circuit 138 can be a micro processing unit, a general processor, or the like. The keyboard 140 may be incorporated into the information handling system 100 or may be external to the information handling system. The keyboard 140 can include a number of keys, such as ECG keys 142, which can have an ECG sensor on a top surface of the keys. The ECG sensors can be used to pick up an ECG signal of a user. In one embodiment, the ECG keys 142 can be a "control" key, an "alt" key, and a "delete" key of a standard QWERTY keyboard. The ECG sensor in an ECG key 142 can be a sensor pad integrated into the top surface of the key, conductive paint coated onto the top of the key, an oil overlay on the key, or the like.

When a user presses and holds his or her fingers from both hands down on two or more of the ECG keys 142, the ECG detector circuit 138 can receive an ECG signal for the user from the keyboard 140. The ECG detector circuit 138 can process the ECG signal and can then store the processed signal as an ECG measurement in the memory 112. In another embodiment, the memory 112 may be embedded within the ECG detector 138. The ECG measurement can be set as access information associated with a user of the information handling system 100. For example, the ECG measurement can be associated with a user profile for the user, such that the user can access the information handling system 100 in response to the ECG measurement being authenticated. The memory 112 can also store additional ECG measurements that can be associated with access information of additional users. In an embodiment, the information handling system 100 can provide the user with an ECG graphical user interface (GUI) 202 to enable the user to set the ECG measurement for the user as his or her access information, as shown in FIG. 2.

Figure 2:
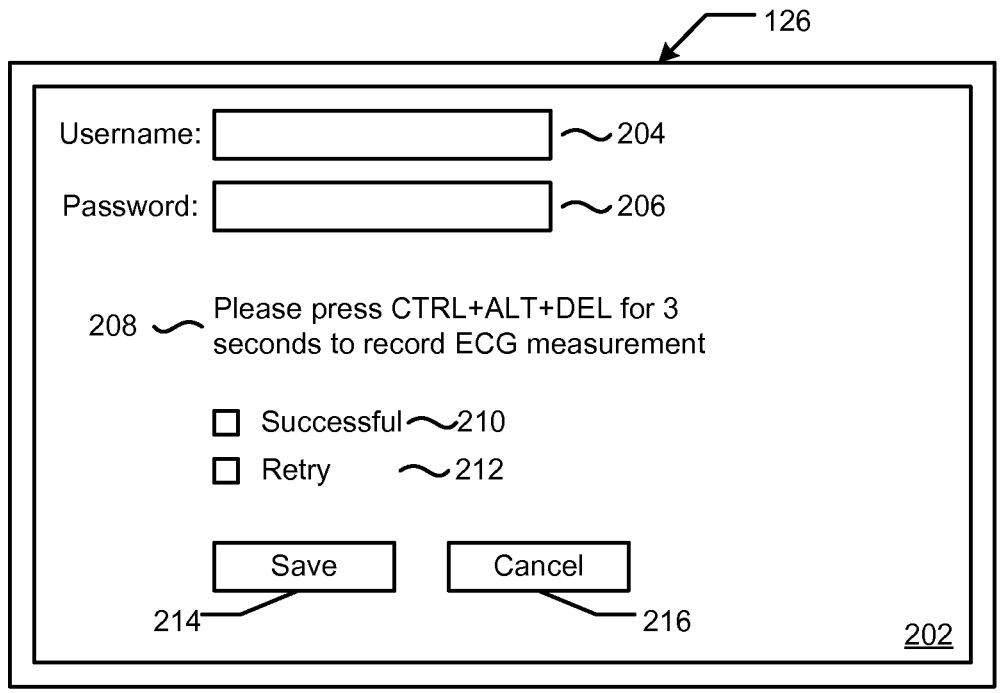
FIG. 2 is an exemplary screen shot of an electrocardiogram graphical user interface of the information handling system.

FIG. 2 shows the ECG GUI 202 on the video display unit 126, including a username box 204, a password box 206, a text block 208, a successful notification 210, a retry notification 212, a save button 214, and a cancel button 216. The user can utilize the ECG GUI 202 to input an ECG measurement to be stored as access information for the user. The user can input a username into the username box 204 and a password into the password box 206 that the user would like to have an ECG measurement associated with. The command text 208 can indicate that the user should press and hold the ECG keys 142, such as control (CTRL), alternate (ALT), and delete (DEL), for a specific period of time. The user can then press and hold the ECG keys 142, which can provide the ECG detector circuit 138 with an ECG signal of the user. If the ECG detector circuit 138 receives a complete ECG signal, the successful notification 210 can be checked to provide the user with a visual notification that the ECG signal was properly received.

However, if the ECG detector circuit 138 does not receive a complete ECG signal, the retry notification 212 can be checked to provide the user with a visual notification to again press and hold the ECG keys 142. When the ECG detector circuit 138 has received a proper ECG signal from the user, the user can select the save button 214 so that the ECG signal can be saved as access information for the user. The ECG detector circuit 138 can process ECG signal to get an ECG measurement and can send the ECG measurement to the memory 112 in response to the selection of the save button 214. The ECG measurement can then be saved in the memory 112 as access information associated with the username and password entered into the respective username box 204 and password box 206. However, if the user decides not to use the ECG signal as access information then the user can select the cancel button 216 to exit the ECG GUI 202.

Figure 3:
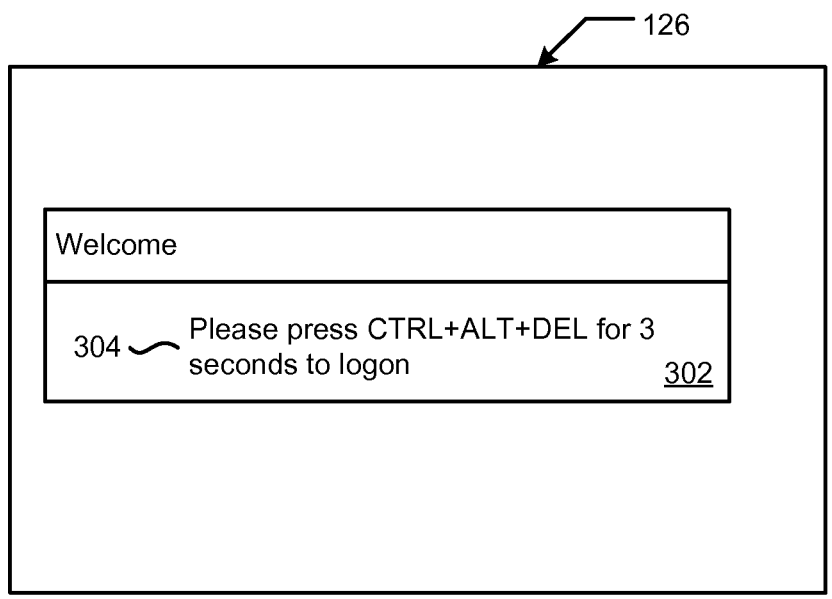
FIG. 3 is an exemplary screen shot of a logon prompt.

FIG. 3 shows the video display unit 126 displaying a logon prompt 302, which in turn includes command text 304. When the ECG signal has been set as the access information for the user, the user can attempt to log on to the information handling system 100 by following the command text 304 that indicates that the user should press and hold the ECG keys 142 for a specific period of time, such as three seconds. Based on the signal received from the ECG keys 142, the user can be either granted access to the information handling system 100, can be presented with a notification 402, or can be presented with a notification 404 as shown in FIG. 4.

Figure 4:
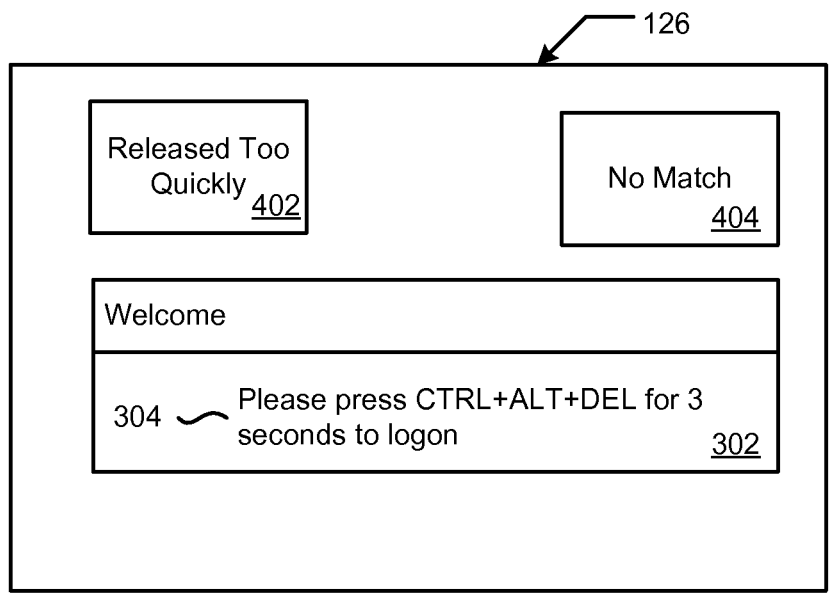
FIG. 4 is another exemplary screen shot of the logon prompt.

FIG. 4 shows the video display unit 126 displaying notifications 402 and 404, the logon prompt 302, and the command text 304. If while trying to log onto the information handling system 100 the user does not hold the ECG keys 142 long enough, notification 402 can be presented to the user via the video display unit 126. The notification 402 can include text indicating that the user released the ECG keys too quickly. The user can then try holding the ECG keys 142 again to provide the ECG detector circuit 138 with an ECG signal. When the ECG detector circuit 138 receives the ECG signal, the ECG detector circuit can process the ECG signal to get a received ECG measurement, and can then compare the received ECG measurement to the ECG measurements stored in the memory 112. If the ECG measurement received by the ECG detector circuit 138 does not match one of the ECG measurements stored in the memory 112, notification 404 can be presented to the user on the video display unit 126. The notification 404 can include text indicating that no match for the ECG measurement was found. The user can then try holding the ECG keys 142 again to provide the ECG detector circuit 138 with another ECG signal.

Figure 5:
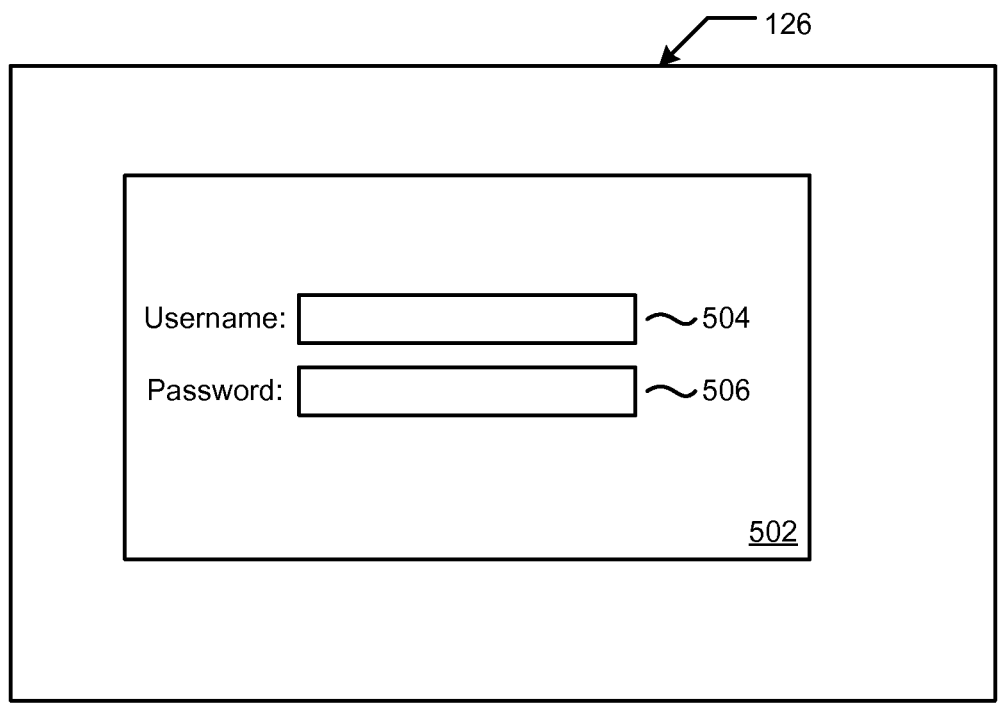
FIG. 5 is an exemplary screen shot of a username/password graphical user interface.

Each time the ECG detector circuit 138 determines that the received ECG measurement does not match the ECG measurements stored in the memory 112, the ECG detector circuit can increment a counter. When the counter exceeds a threshold, a username/password GUI 502 can be presented to the user on the video display unit 126 as shown in FIG. 5. However, if the ECG detector circuit 138 determines that a received ECG measurement matches one of the stored ECG measurements, the ECG detector circuit can reset the counter to zero and can provide the user with access to the information handling system 100.

FIG. 5 shows the video display unit 126 displaying the username/password GUI 502, which includes a username box 504 and a password box 506. The user can enter a username and password into the respective username box 504 and password box 506 so that the user can access the information handling system 100. The username and password can then be compared to access information stored in the memory 112 to determine whether the user is authorized to access the information handling system. If the username and password match the stored access information, the user can be granted access to the information handling system. Otherwise, the user can be denied access.

In another embodiment, the keyboard 140 may be external to the information handling system 100 and may function as a remote terminal, such that the user only has access to the keyboard and the video display unit 126 while the remainder of the information handling system is located at another location. The user can provide his or her ECG signal via the keyboard 140 as described above with respect to FIGS. 1-5, but the ECG signal can be sent from the keyboard 140 to a remote information handling system 100 via a network 144. In this embodiment, the keyboard 140 can communicate the ECG signal to the ECG detector 138 or processor 102 via the network 144 and the I/O interface 130. The ECG detector 138 or processor 102 can then match the ECG signal to a stored ECG signal in the memory 112 as described above with respect to FIGS. 1-5. If the ECG signal matches a stored ECG signal, the information handling system 100 can send an authentication signal to the keyboard 140 of the remote terminal via the I/O interface 130 and the network 144. The user can then be granted access to the remote terminal in response to the authentication signal.

Figure 6:
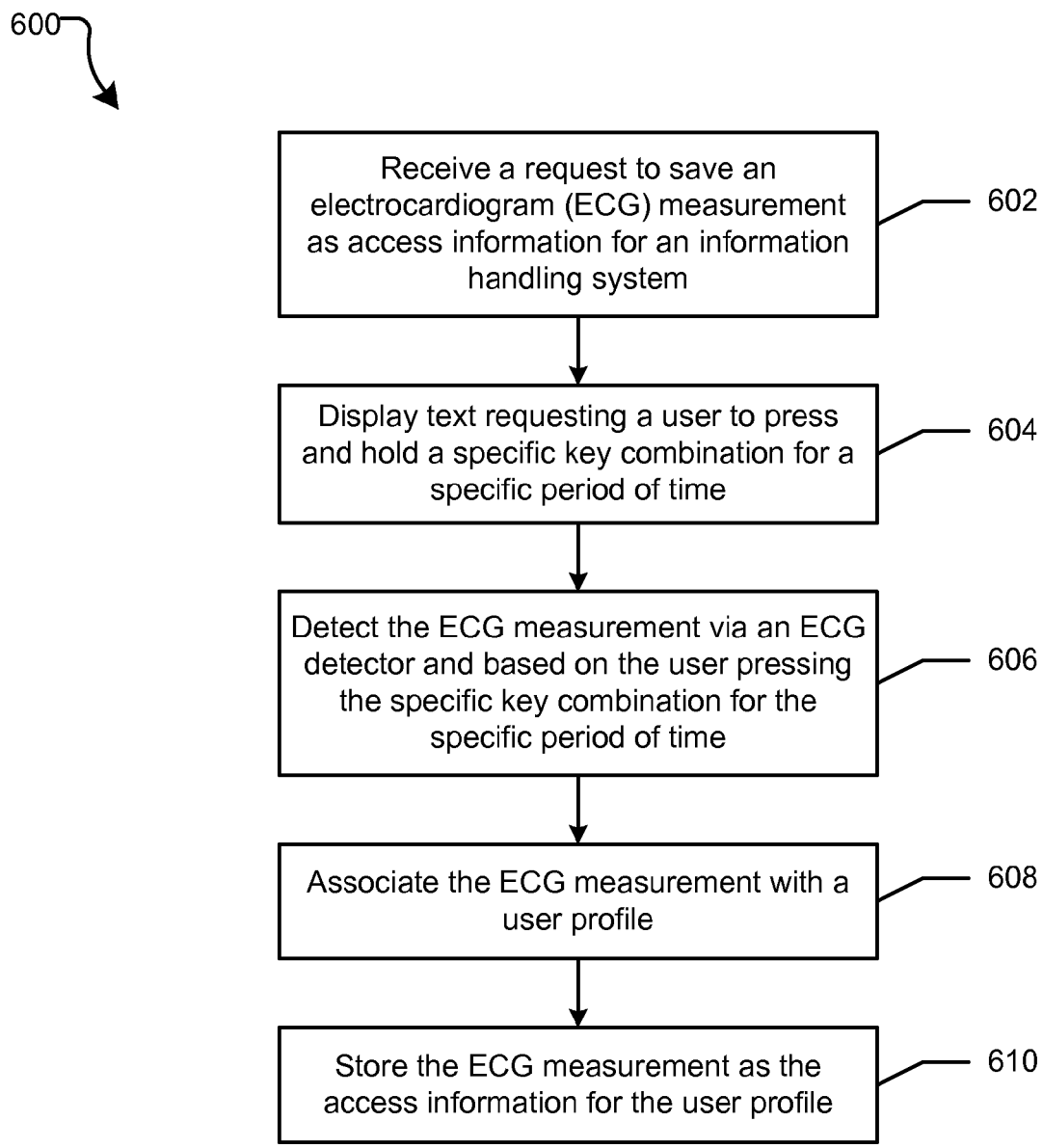
FIG. 6 is a flow diagram of a method for storing an electrocardiogram measurement as access information for the information handling system.

FIG. 6 illustrates a method 600 for storing an electrocardiogram (ECG) measurement as access information for the information handling system. At block 602, a request to save an ECG measurement as access information for the information handling system is received. Text requesting a user to press and hold a specific key combination for a specific period of time is display at block 604. The specific key combination can be a control key, an alt key, and a delete key of a standard keyboard. Each key in the specific key combination can include an ECG sensor on a top surface of the key. The ECG sensor can be a sensor pad integrated into the top surface of the key, conductive paint coated onto the top of the key, an oil overlay on the key, or the like. At block 606, the ECG measurement is detected via an ECG detector circuit and based on the user pressing the specific key combination for the specific period of time. The ECG measurement is associated with a user profile at block 608. At block 610, the ECG measurement is stored as the access information for the user profile.

Figure 7:
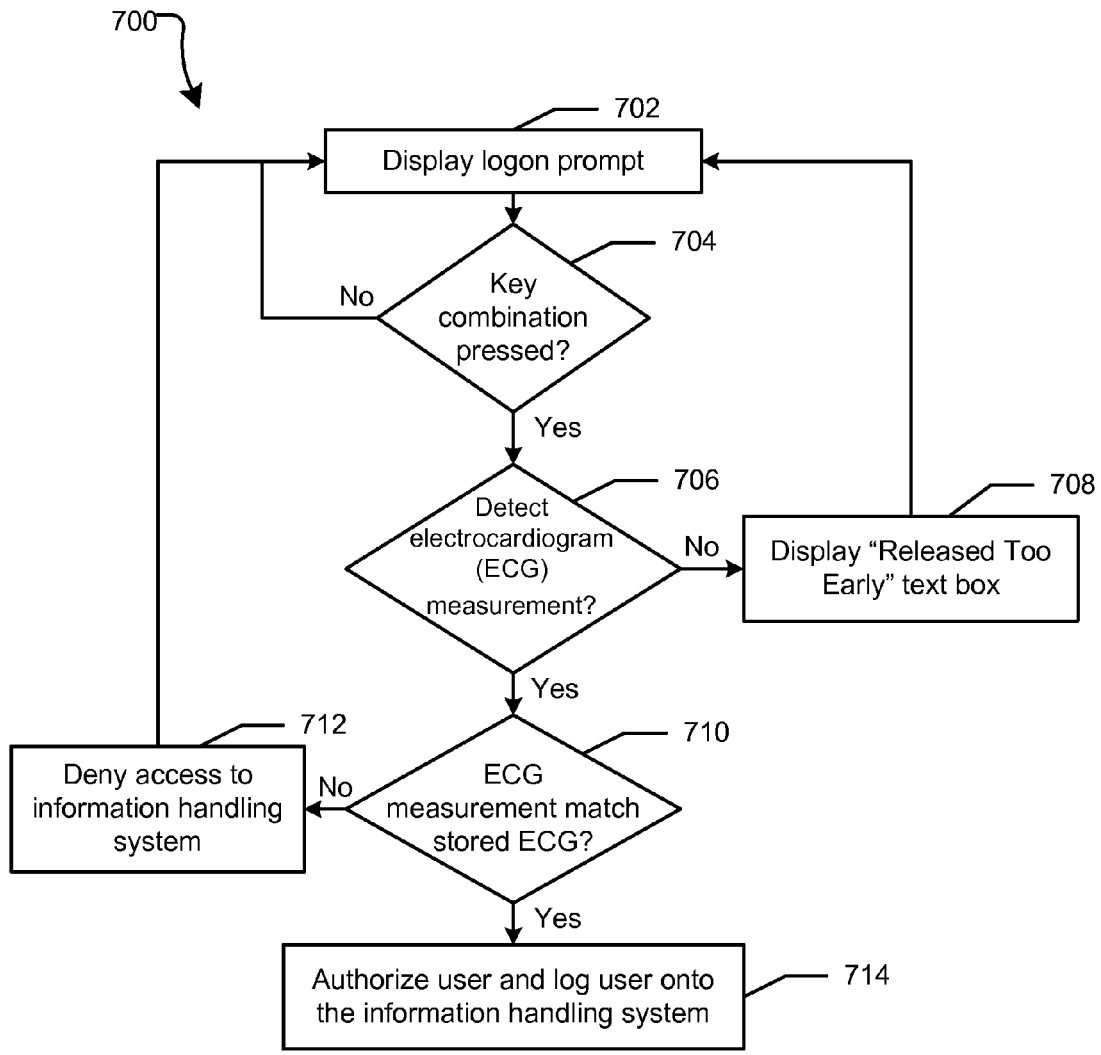
FIG. 7 is a flow diagram of a method for authorizing access to the information handling based on the electrocardiogram measurement.

FIG. 7 illustrates a method 700 for authorizing access to the information handling based on the electrocardiogram (ECG) measurement. At block 702, a logon prompt is displayed on a display device of the information handling system. A determination is made whether a specific key combination has been pressed at block 704. The specific key combination can be a control key, an alt key, and a delete key of a standard keyboard. Each key in the specific key combination can include an ECG sensor on a top surface of the key. The ECG sensor can be a sensor pad integrated into the top surface of the key, conductive paint coated onto the top of the key, an oil overlay on the key, or the like. If the specific key combination has not been pressed the flow repeats as stated above at block 702. If the specific key combination has been pressed, a determination is made whether an ECG measurement is detected at block 706. If the ECG measurement has not been detected, a text box including "Released Too Early" is displayed at block 708, and the flow repeats as stated above at block 702.

If the ECG measurement is detected, a determination is made whether the ECG measurement matches a stored ECG measurement at block 710. The comparison can be performed by an ECG detector circuit, which can be a microprocessor unit, by a general processor, or the like. If the ECG measurement does not match the stored ECG measurement, access to the information handling system is denied at block 712, and the flow repeats as stated above at block 702. However, if the ECG measurement matches the stored ECG measurement, the user is authorized and is logged onto the information handling system at block 714.

Figure 8:
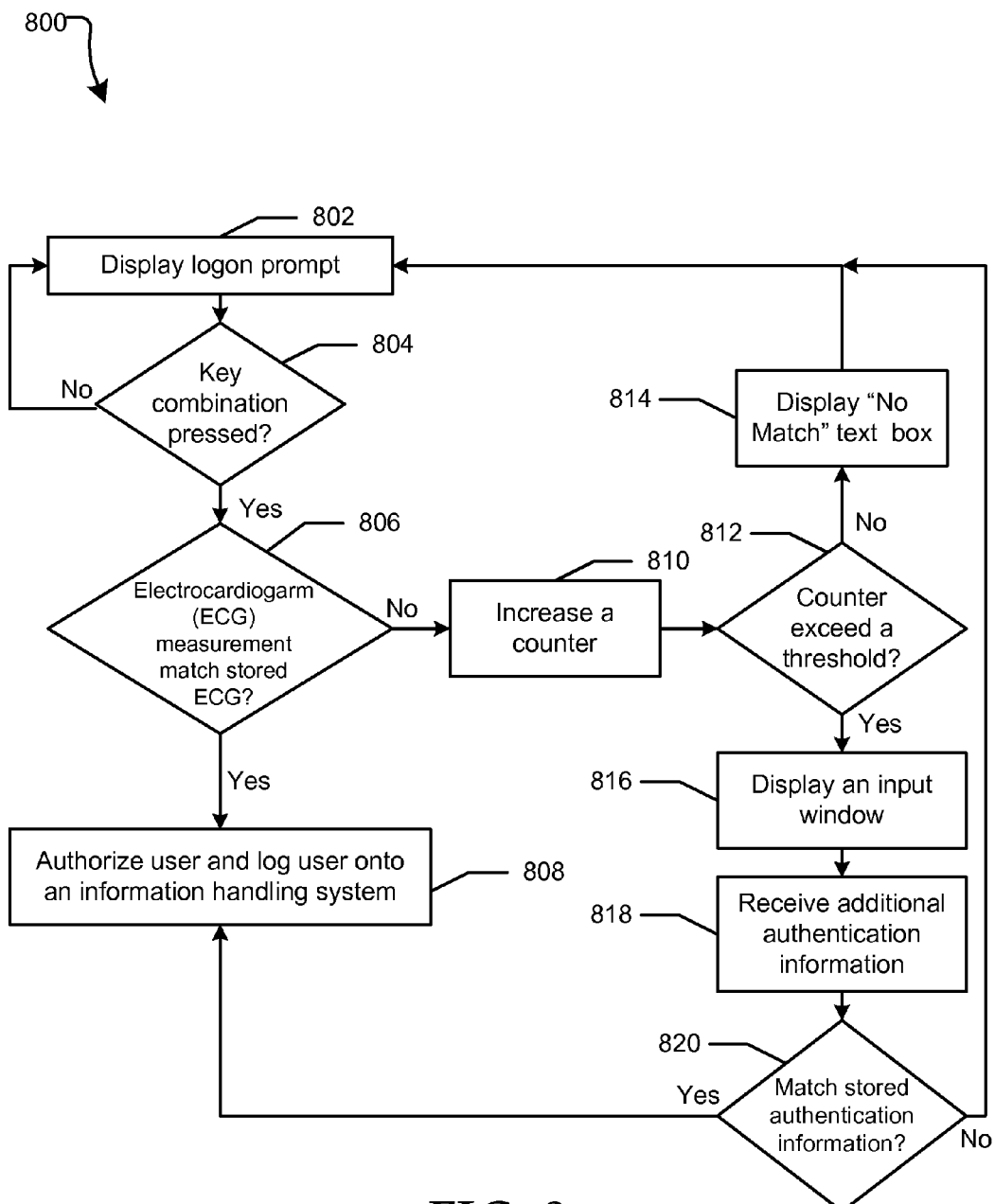
FIG. 8 is a flow diagram of another method for authorizing access to the information handling based on the electrocardiogram measurement.

FIG. 8 illustrates a method 800 for authorizing access to the information handling based on the electrocardiogram (ECG) measurement. At block 802, a logon prompt is displayed on a display device of the information handling system. A determination is made whether a specific key combination has been pressed at block 804. The specific key combination can be a control key, an alt key, and a delete key of a standard keyboard. Each key in the specific key combination can include an ECG sensor on a top surface of the key. The ECG sensor can be a sensor pad integrated into the top surface of the key, conductive paint coated onto the top of the key, an oil overlay on the key, or the like. If the specific key combination has not been pressed the flow repeats as stated above at block 802. If the specific key combination has been pressed, a determination is made whether an ECG measurement matches at stored ECG measurement at block 806.

If the ECG measurement matches the stored ECG measurement, the user is authorized and is logged onto the information handling system at block 808. However, if the ECG measurement does not match the stored ECG measurement, access to the information handling system is denied and a counter is increase at block 810. A determination is made whether the counter has exceeded a threshold at block 812. If the counter has not exceeded the threshold, a text block including "No Match" is displayed at block 814, and the flow repeats as stated above at block 802.

If the counter has exceeded the threshold, an input window is displayed at block 816. At block 818, additional authentication information is received. The additional authentication information can be administrator intervention, other biometric information, a token, or the like. A determination is made whether the additional authentication information matches stored additional authentication information at block 820. If the additional authentication information matches the stored additional authentication information, the user is authorized and is logged onto the information handling system at block 808, otherwise the flow repeats as stated above at block 802.

Although only a few exemplary embodiments have been described in detail in the exemplary embodiments without materially departing from the novel teachings and advantages of the embodiments of the present disclosure. For example, the methods described in the present disclosure can be stored as instructions in a computer readable medium to cause a processor, such as chipset 110, to perform the method. Additionally, the methods described in the present disclosure can be stored as instructions in a non-transitory computer readable medium, such as a hard disk drive, a solid state drive, a flash memory, and the like. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a memory configured to store a first electrocardiogram measurement; and
a detector circuit in communication with the memory, the detector circuit configured to receive an initial electrocardiogram measurement to be set as user access information for the information handling system, to remove the initial electrocardiogram measurement in response to a cancel request from the user, to store the initial electrocardiogram measurement as the first electrocardiogram measurement in response to a save request from the user, to receive a second electrocardiogram measurement in response to a specific combination of keys of a keyboard being pressed for a specific period of time, wherein each key in the specific combination of keys includes an electrocardiogram sensor on a top surface of the key, to authorize a user and log the user onto the information handling system when the second electrocardiogram measurement matches the first electrocardiogram measurement, and otherwise:
to deny access to the information handling system;
to increase a counter;
to determine whether the counter has exceeded a threshold; and
to request different authentication information via an input window when the counter has exceeded the threshold.

2. The information handling system of claim 1 further comprising:
a video display unit in communication with the detector circuit, the video display unit configured to display a logon prompt prior to the detector circuit receiving the second electrocardiogram measurement, and to display the input window.

3. The information handling system of claim 2 wherein the video display unit is further configured to display a notification text box when the counter has not exceeded the threshold.

4. The information handling system of claim 3 wherein the notification text box indicates that the second electrocardiogram measurement does not match the first electrocardiogram measurement.

5. The information handling system of claim 1 wherein the keyboard is a QWERTY keyboard.

6. The information handling system of claim 1 further comprising:
a processor in communication with the detector circuit, the processor configured to receive additional authentication information in response to the input window being displayed, to determine whether the additional authentication information matches a stored additional authentication information, and if the additional authentication information matches the stored additional authentication information to authorize the user and log the user onto the information handling system, other to deny access to the information handling system.

7. The information handling system of claim 1 wherein the additional authentication information is selected from a group consisting of administrator intervention, other biometric information, and a token.

8. The information handling system of claim 1 wherein the electrocardiogram sensor is selected from a group consisting of a sensor pad integrated into the top surface of the key, conductive paint coated onto the top of the key, and an oil overlay on the key.

9. A method comprising:
displaying a logon prompt on a display device of an information handling system, wherein the logon prompt indicates that a specific key combination is to be pressed for a specific period of time to access the information handling system, and wherein each key in the specific key combination includes an electrocardiogram sensor on a top surface of the key;
determining whether the specific key combination was pressed for the specific period of time;
displaying a first notification text box in response to the specific key combination not being pressed for the specific period of time, wherein the first notification text box indicates that specific key combination was released too early;
receiving a first electrocardiogram measurement in response to the specific key combination being pressed for the specific period of time;
determining whether the first electrocardiogram measurement matches a second electrocardiogram measurement stored in a memory;
if the first electrocardiogram measurement matches the second electrocardiogram measurement, then:
authorizing a user; and logging the user onto the information handling system; and if the first electrocardiogram measurement does not match the second electrocardiogram measurement, then:
  denying access to the information handling system;
  increasing a counter;
  determining whether the counter has exceeded a threshold; and
  displaying an input window when the counter has exceeded the threshold.

10. The method of claim 9 further comprising:
receiving a request to save the second electrocardiogram measurement as the access information for the information handling system;
display text requesting the user to press the specific key combination for the specific period of time;
detecting, via the detector circuit, the second electrocardiogram measurement in response to the user pressing the specific key combination for the specific period of time;
associating the second electrocardiogram measurement with the user profile; and
storing the second electrocardiogram measurement as the access information for the user profile in the memory.

11. The method of claim 9 further comprising:
displaying a notification text box when the counter has not exceeded the threshold.

12. The method of claim 11 wherein the notification text block indicates that the first electrocardiogram measurement does not match the second electrocardiogram measurement.

13. The method of claim 9 wherein the comparison is performed by the detector circuit.

14. The method of claim 9 wherein the detector circuit is selected from a group consisting of a microprocessor unit and a general processor.

15. The method of claim 9 wherein if the first electrocardiogram measurement does not match the second electrocardiogram measurement, further comprising:
  receiving additional authentication information in response to displaying the input window;
  determining whether the additional authentication information matches a stored additional authentication information; and
  if the additional authentication information matches the stored additional authentication information, then logging the user onto the information handling system.

16. A method comprising:
receiving a request to save a first electrocardiogram measurement as access information for an information handling system;
displaying text requesting a user to press a specific key combination for a specific period of time, wherein each key in the specific key combination includes an electrocardiogram sensor on a top surface of the key;
detecting, via a detector circuit, the first electrocardiogram measurement in response to the user pressing the specific key combination for the specific period of time;
associating the first electrocardiogram measurement with a user profile;
storing the first electrocardiogram measurement as the access information for the user profile;
displaying a logon prompt on a display device;
determining whether a second electrocardiogram measurement is detected when the specific key combination has been pressed;
displaying a first notification text box when the second electrocardiogram measurement has not been detected, wherein the first notification text box indicates that specific key combination was released too early;
determining whether the second electrocardiogram measurement matches the first electrocardiogram measurement when the second electrocardiogram measurement is detected; and
if the second electrocardiogram measurement matches the first electrocardiogram measurement, then logging the user onto the information handling system.

17. The method of claim 16 wherein the detector circuit is selected from a group consisting of a microprocessor unit and a general processor.

18. The method of claim 16 wherein the electrocardiogram sensor is selected from a group consisting of a sensor pad integrated into the top surface of the key, conductive paint coated onto the top of the key, and an oil overlay on the key.

* * * * *